United States Patent [19]

Karam et al.

[11] Patent Number: 4,591,613

[45] Date of Patent: May 27, 1986

[54] HYDROXYALKYL MELAMINE CONTAINING RESINS AND THEIR USE IN HEAT AND PRESSURE CONSOLIDATED LAMINATES

[75] Inventors: Fouad T. Karam, Brossard; Jack I. Sibalis, St. Lambert, both of Canada

[73] Assignee: American Cyanamid Company, Stamford, Conn.

[21] Appl. No.: 727,952

[22] Filed: Apr. 26, 1985

[51] Int. Cl.⁴ ............................................. C08L 61/22
[52] U.S. Cl. .................................... 524/597; 524/598; 525/515; 528/254; 528/258
[58] Field of Search ................ 524/597, 598; 525/515; 528/254, 258

[56] References Cited

U.S. PATENT DOCUMENTS

| | | | |
|---|---|---|---|
| 4,250,069 | 2/1981 | Yates | 524/598 X |
| 4,369,286 | 1/1983 | Czepel et al. | 524/598 |
| 4,448,849 | 5/1984 | Keeling et al. | 525/515 X |

*Primary Examiner*—Lucille M. Phynes
*Attorney, Agent, or Firm*—Frank M. Van Riet

[57] ABSTRACT

A method for the production of hydroxyalkylmelamine containing resins wherein melamine, formaldehyde and a hydroxyalkylmelamine are reacted under conditions such that a resin is produced which, when incorporated into a decorative laminate, enhances the post-forming thereof, the resin per se, paper sheets containing said resin, a method for the production of laminates and the laminates per se, are disclosed.

4 Claims, No Drawings

HYDROXYALKYL MELAMINE CONTAINING RESINS AND THEIR USE IN HEAT AND PRESSURE CONSOLIDATED LAMINATES

BACKGROUND OF THE INVENTION

Heat and pressure consolidated laminates are generally produced utilizing a core material comprising a plurality of phenolic resin impregnated paper sheets, a decor sheet impregnated with a melamine-formaldehyde resin and, optionally, a melamine-formaldehyde resin impregnated overlay sheet. These laminates have found world-wide success as construction materials i.e. wall panels, countertops etc., in the home and office. They can be prepared so as to function in a variety of service applications and can be produced with surfaces of high gloss, a matte finish or an embossed finish. They can be rendered post-formable with the application of heat and can be cut or worked much in the same manner as other building materials.

Although the above-described laminates have found a high degree of success over the past forty years, there is a continual need to improve the laminates and/or the method of their preparation and, accordingly, research is always on the outlook for means to achieve such improvements.

One of the properties of heat and pressure consolidated laminates for which an ongoing search for improvement is continually being conducted is the post-formability of laminates containing cores produced from phenolic resins. That is to say, post-formability is now imparted to decorative, heat and pressure consolidated laminates by using X-creped papers and/or a post-forming resin which is less than fully cured in the core of the laminate. The X-creped papers are substituted in part or in full for the kraft papers which are normally used in non-postforming laminates and, in the production of the laminates, the cure cycle employed in the laminating press is such that the resin components in the laminates are not fully cured. The undercuring of the resins reduces the laminate rigidity and enables post-forming to be effected with the application of additional heat in the area of the desired bend.

In U.S. Pat. No. 4,424,261 there is disclosed the use of hydroxyalkylmelamine modified resins in decorative laminates for the purpose of imparting post-formability to said laminates and to also eliminate the dark edge line thereof which is evident when the laminate is cut to size. In the invention disclosed in said patent, although the post-formability was somewhat increased in comparison to known laminates, there still exists a need to further improve the post-formability of said products.

SUMMARY OF THE INVENTION

The use of a hydroxyalkyl melamine modified formaldehyde resin produced in accordance with the process of the present invention as the laminating resin in the decor sheet of decorative laminates enhances the post-formability of said laminates. The use of the hydroxyalkyl melamine modified resin system results in laminates exhibiting toughness, dimensional stability, impact resistance etc. which meet NEMA and CAN-3 Standards for high pressure decorative laminates based on phenolic resin impregnated core sheets. In addition, the resin per se exhibits a shelf-life of twenty-one days or more as compared to conventional melamine/formaldehyde resins which oftimes have a shelf-life of only 3–10 days. Furthermore, the novel resins of the present invention are less sensitive to an advanced degree of cure than conventional resins, i.e. they still enable laminates containing them to be post-formed at an advanced degree of cure, and, in fact, need not be controlled regarding their undercure as is usually the practice in producing post-formable laminates.

Conventional decorative laminates of the post-forming variety are produced with a 0.6–0.8% relative cure and enable wrap-around radii of ½–⅝" to be achieved. Using the resins of the present invention, a relative cure of 1.2–1.4% is possible. Furthermore, at, 6–8% relative cure, wrap-around radii of ¼" are possible.

DESCRIPTION OF THE INVENTION INCLUDING PREFERRED EMBODIMENTS

The present invention comprises a method for the production of a laminating resin which comprises simultaneously reacting, in the presence of water, (1) a hydroxyalkyl melamine having the formula:

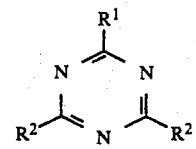

wherein $R'$ is a $C_1$–$C_8$ linear or branched chain alkyl group, a $C_6$–$C_{10}$ aryl group or $R^2$ and $R^2$ is —$NH_2$, —$NH(CH_2)_xOH$ or

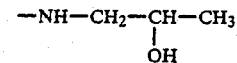

wherein x is 3–8, inclusive, and at least one $R^2$ is a hydroxyalkyl group, (2) formaldehyde and (3) melamine, the molar ratio of (2) to (3) ranging from about 1.2:1 to 2.0:1, respectively, and the molar ratio of (1) to (3) ranging from about 0.03 to 1 to 0.15 to 1, respectively, at a pH ranging from about 8–11, at a temperature ranging from about 95° C. to 105° C. under atmospheric pressure or under superatmospheric pressure at about 110°–130° C., for from about 15 to 45 minutes in the presence of a condensation catalyst and reducing the temperature to about 70° C. to 90° C. at atmospheric pressure until a water tolerance of from about 200 to 600% is reached.

The preferred molar ratio of (2) to (3) is from about 1.4:1 to 1.8:1, respectively, and the preferred molar ratio of (1) to (3) is from about 0.07 to 1 to 0.11 to 1, respectively. The temperature under atmospheric pressure preferably ranges from about 100° C. to about 105° C. and under superatmospheric pressure preferably ranges from about 115°–125° C. The time of reaction is preferably from about 20 to 40 minutes. The preferred secondary temperature is from about 75°–85° C. at atmospheric pressure and the preferred water tolerance is from about 350 to 450%.

Solvents such as methanol, isopropanol, etc. are not required herein, however, condensation catalysts such as triethanolamine, diethylethanolamine, sodium hydroxide and mixtures thereof etc. must be used in concentrations ranging from about 0.2–2.0%, based on the weight of melamine charged.

The resins produced by the above-described process are also considered to fall within the scope of the present invention in that they exhibit a longer shelf-life and impart a higher degree of post-formability to the laminates in which they are incorporated as compared to prior art resins.

The novel resins produced by the process of the present invention may be incorporated (impregnated) into the paper sheets to be used as components of the decorative laminates in amounts ranging from about 15% to 80%, by weight, based on the weight of the sheet, preferably from about 30% to 65%, by weight.

As described in the above-referenced U.S. patent, the hydroxyalkyl melamines used herein are well-known in the art and can be prepared using any known procedure. One procedure which has been found to be particularly advantageous is set forth in U.S. Pat. No. 4,312,988 wherein an alkanolamine is reacted with an appropriately substituted melamine at 100°–250° C. in the presence of an acid catalyst.

The hydroxyalkylmelamines used in the present invention, as prepared by the process of said U.S. Pat. No. 4,312,988, are generally recovered in the form of mixtures in which the individual species vary as to the number of hydroxyalkylamine groups they contain. For convenience, these mixtures are identified by the m.e.q. (hydroxy milliequivalent by gram). The m.e.q. indicates the nature of the mixture and usually ranges from about 4 to about 10. A preferred mixture is a mixture of di- and tri-2-hydroxypropyl melamines.

The resin compositions of the present invention are preferably used to impregnate the decor sheet which is, in turn, used in conjunction with kraft core sheets which have been impregnated with a conventional postforming resin of the phenol/formaldehyde type, and optionally, a conventional melamine/formaldehyde resin impregnated overlay sheet. Laminates manufactured according to this configuration exhibit increased post-formability, as mentioned above.

Alternatively, although less favorably, the resins of the present invention may be used to replace all or part of the conventional phenol/formaldehyde or melamine/formaldehyde resins employed in the production of conventional decorative laminates so as to impart thereto any beneficial property or properties which may result therefrom.

When the kraft paper core sheets are pigmented the same color as the decor sheet and the resin of the present invention is used to impregnate all the components of the laminate assembly, laminates exhibiting a full color throughout the laminate cross-section may be prepared as described in the above-mentioned U.S. patent.

The core sheets are usually constructed of kraft paper which, as mentioned above, can be creped or non-creped or used as combinations of creped and non-creped sheets. The kraft sheets can be unbleached kraft, bleached kraft, pigmented kraft, pigmented, bleached kraft etc. and each of these can be used in the formation of laminates in accordance with the present invention.

The properties of the resultant laminates meet accepted and required NEMA and/or CAN3-A172 standards.

The following examples are set forth for purposes of illustration only and are not to be construed as limitations on the present invention except as set forth in the appended claims. All parts and percentages are by weight unless otherwise specified.

EXAMPLE 1

Into a suitable stainless steel reactor equipped with a stirrer, the following materials are charged:

Formaldehyde 1.35 moles, a mixture of di and tri-2-hydroxypropylmelamine, 0.07 mole and melamine crystals, 1.0 mole. Water is added as reaction medium. The weight of water is calculated to give a final solids content of 48–51% of the resulting resin.

The pH is adjusted to 10.2 with a mixture of caustic soda and diethylethanolamine (1:7).

The heating cycle consists of two parts:
 The first part at 103° C. for about 30 minutes at atmospheric pressure;
 The second part at 80° C. for about 180 minutes at atmospheric pressure.

The resultant resin has a water tolerance of about 450%, a shelflife over 21 days and time to reach full cure "Tc" at 136° C. of 80 minutes measured on glass braid by the means of the Torsional Brand Analyzer.

EXAMPLE 2

(Comparative)

In the same type reactor as used in Example 1, the following materials are charged:

Formaldehyde 1.4 moles, melamine crystals 1.0 mole and water as reaction medium.

The pH is adjusted to 9.5, as in Example 1.

The heating cycle consists of two parts:
 The first part at 103° C. for 15 minutes, at atmospheric pressure.
 The second part at 90° C. for 90 minutes at atmospheric pressure.

Shelflife is less than 10 days and Tc at 136° C. is about 50 minutes.

EXAMPLE 3

The hydroxypropylmelamine modified resins of Examples 1 and 2 are each impregnated into a sheet of decor paper "Polar White 75 lb" at 50% resin content (volatile content 6%) then the paper is cured to an equal degree of relative cure as commercial postforming laminates. The decrease of modulus "ΔG Pa" of cured sheet is measured between 25° C. and 156° C. and the glass transition temperature "Tg" is also determined.

| | Resin | G Pa | Tg |
|---|---|---|---|
| A. | Hydroxypropylmelamine modified melamine resin of Example 1 | 1.5 | 140° C. |
| B. | Regular postforming melamine resin of Example 2 | 0.4 | 180° C. |

The greater the decrease in modulus, the better the formability of the sheet. The lower the Tg temperature, the lower the forming temperature of the sheet.

EXAMPLE 4

The sheet of impregnated decor paper of Example 3A is pressed in conjunction with 3, 4 and 5 sheets of phenolic resin impregnated kraft "115 lb basis weight" of which one sheet is extensible kraft.

The sheets are laminated at 1,400 p.s.i. at 135° C. for 60 minutes. The resultant three laminates are in compliance with NEMA and CAN3 standards and, in addition, exhibit increased postforming capability.

EXAMPLE 5

Example 3 is again followed except that the phenol/formaldehyde resin is eliminated from the core, the resin of Example 1 is used to replace it and the kraft sheets are pigmented the same white color as the decor sheet. A laminate is produced which is post-formable and is completely white throughout its cross-section when cut.

We claim:

1. A method for the production of a laminating resin which comprises simultaneously reacting, in the presence of water, (1) a hydroxyalkyl melamine having the formula

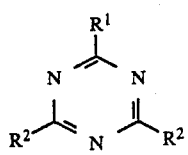

wherein $R^1$ is a $C_1-C_8$ linear or branched chain alkyl group, a $C_6-C_{10}$ aryl group or $R^2$ and $R^2$ is $-NH_2$, $-NH(CH_2)_xOH$ or

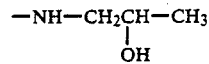

wherein x is 3-8, inclusive, and at least one $R^2$ is a hydroxyalkyl group, (2) formaldehyde and (3) melamine, the molar ratio of (2) to (3) ranging from about 1.2:1 to 2.0:1, respectively, and the molar ratio of (1) to (3) ranging from about 0.03 to 1 to 0.15 to 1, respectively, at a pH ranging from about 8-11, at a temperature ranging from about 95° C. to 105° C. under atmospheric pressure or under superatmospheric pressure at about 110°-130° C., for from about 15 to 45 minutes, and in the presence of a condensation catalyst and reducing the temperature to about 70° to 90° C. under atmospheric pressure until a water tolerance of from about 200 to 600 is reached.

2. A method according to claim 1 wherein said hydroxyalkyl melamine is a mixture of di and tri 2-hydroxypropyl melamines.

3. The resin produced by the method of claim 1.

4. The resin produced by the method of claim 2.

* * * * *